(12) United States Patent
Koch et al.

(10) Patent No.: US 6,359,888 B1
(45) Date of Patent: Mar. 19, 2002

(54) METHOD FOR DETECTING INVALID PACKETS BY REWRITING TRANSACTION IDENTIFERS

(75) Inventors: Edward L. Koch, San Rafael, CA (US); Stefan Soucek, Trumau (AT)

(73) Assignee: Coactive Networks, Inc., Sausalito, CA (US)

( * ) Notice: Subject to any disclaimer, the term of this patent is extended or adjusted under 35 U.S.C. 154(b) by 0 days.

(21) Appl. No.: 09/609,890

(22) Filed: Jul. 5, 2000

(51) Int. Cl.[7] .............................................. H04L 12/28
(52) U.S. Cl. ............................ 370/394; 370/389; 714/1
(58) Field of Search ................................ 370/389, 392, 370/394, 400, 401, 351–356, 236, 411–418, 428–429; 709/238, 232; 714/1, 21, 748, 749–752, 776

(56) References Cited

U.S. PATENT DOCUMENTS

| 5,127,000 A | * | 6/1992 | Henrion ...................... 370/394 |
| 5,491,728 A | * | 2/1996 | Verhille et al. ............. 370/394 |
| 5,856,972 A | * | 1/1999 | Riley et al. ................. 370/389 |

\* cited by examiner

*Primary Examiner*—Wellington Chin
*Assistant Examiner*—Steven Nguyen
(74) *Attorney, Agent, or Firm*—Sawyer Law Group LLP

(57) ABSTRACT

The present invention provides a method for reliable stale packet recognition in a network. The method includes: rewriting a packet's transaction identifier (TID) such that the rewritten TID is not a same TID as a previous transaction if the packet could be erroneously seen as a duplicate packet by the receiving router; sending the packet to the receiving router; and blocking the sent packet from transmission to the receiving node if a transaction timer has expired and if the sent packet's TID is the same TID as the previous transaction. The method blocks duplicate packets which arrive at the receiving router after the expiration of the transaction timer. When a packet for a new transaction to be sent to the receiving node is assigned the same TID as the previous transaction, the sending router rewrites the packet's TID to avoid the erroneous recognition of this packet as a duplicate by the receiving router. In this manner, if a packet with the original TID is truly part of a new transaction, it will not be blocked from the receiving node. With this method, errors in the control network due to erroneous duplicate detection when run over an IP network are prevented.

20 Claims, 5 Drawing Sheets

METHOD FOR DETECTING INVALID PACKETS BY REWRITING TRANSACTION IDENTIFERS

FIELD OF THE INVENTION

The present invention relates to control networks utilizing a network protocol, and more specifically to the use of transaction identifiers for control network packets traveling in network which utilize the network protocol.

BACKGROUND OF THE INVENTION

LonTalk™ is a well known control network communications protocol designed for Local Area Network (LAN) type environments. This protocol can also be transported in an Internet protocol (IP) environment as well. FIG. 1 illustrates an IP network which is used to transport the LonTalk protocol. The network includes subnets 102 and 118, each with local nodes. Local nodes on one subnet 102 are able to communicate with nodes on the remote subnet 118 over the IP network 112. An exchange of information between nodes is carried out in a transaction. Each transaction involves at least one packet. For example, a sending node 104 on subnet 102 prepares a packet 106 addressed to the receiving node 120 on subnet 118. The sending node 104 assigns a Transaction Identifier (TID) to all packets of a certain transaction. In LonTalk, 4-bits are used for the TID, i.e., 16 possible TIDs are available. This packet 106 is forwarded to the sending router 108 which services the sending node's subnet 102. The packet 106 is then transmitted to the receiving router 114 which services the subnet 118 containing the receiving node 120. The receiving router 114 then forwards the packet 106 to the receiving node 120.

At the receiving node 120, a transaction timer (receive timer) begins to run when a transaction begins. The receive transaction is active until the timer expires or a new transaction is started. Packets received containing the same TID while the transaction is active are assumed by the receiving node 120 to be part of the same transaction. Each time the receiving node 120 receives a packet 106, it may send to the sending node 104 an acknowledgment packet, which informs the sending node 104 that the packet 106 was actually received by the receiving node 104.

Occasionally, packets need to be retransmitted due to transmission errors and are given the same TID as the original packet. While the transaction is active, if the receiving node had already received the original packet, it will properly detect packets with the same TID to be duplicates. In LonTalk, the length of the transaction timer is set according to the possible delays in packet transmission in a LAN, which do not vary significantly. However, in an IP network, the delays can vary over a wider range and can be unpredictable. Thus, there is a problem in an IP network that packets become delayed such that they arrive after the expiration of the transaction timer. In this situation, the receiving node will not be able to recognize stale duplicate packets as such. It may mistakenly see the duplicate packet as indicating the beginning of a new transaction, resulting in erroneous functioning in the control network application.

Accordingly, there exists a need for a method to detect stale packets for reliable duplicate packet recognition for the control network. The present invention addresses such a need.

SUMMARY OF THE INVENTION

The present invention provides a method for reliable stale packet recognition in a network. The method includes: rewriting a packet's transaction identifier (TID) such that the rewritten TID is not a same TID as a previous transaction if the packet could be erroneously seen as a duplicate packet by the receiving router; sending the packet to the receiving router; and blocking the sent packet from transmission to the receiving node if a transaction timer has expired and if the sent packet's TID is the same TID as the previous transaction. The method blocks duplicate packets which arrive at the receiving router after the expiration of the transaction timer. When a packet for a new transaction to be sent to the receiving node is assigned the same TID as the previous transaction, the sending router rewrites the packet's TID to avoid the erroneous recognition of this packet as a duplicate by the receiving router. In this manner, if a packet with the original TID is truly part of a new transaction, it will not be blocked from the receiving node. With this method, errors in the control network due to erroneous duplicate detection when run over an IP network are prevented.

DETAILED DESCRIPTION

The present invention provides a method for reliable stale packet recognition in a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method in accordance with the present invention provides reliable stale packet recognition in a network utilizing LonTalk by blocking duplicate packets which arrive at the receiving router after the expiration of the transaction timer. When a packet for a new transaction to be sent to the receiving node is assigned the same transaction identifier (TID) as a packet of the previous transaction, the sending router rewrites the packet's TID to avoid the erroneous recognition of this packet as a stale duplicate by the receiving router. In this manner, the packet for the new transaction will not be mistakenly blocked as a stale duplicate packet by the receiving router.

To more particularly describe the features of the present invention, please refer to FIGS. 2 through 5 in conjunction with the discussion below.

Figure 1:
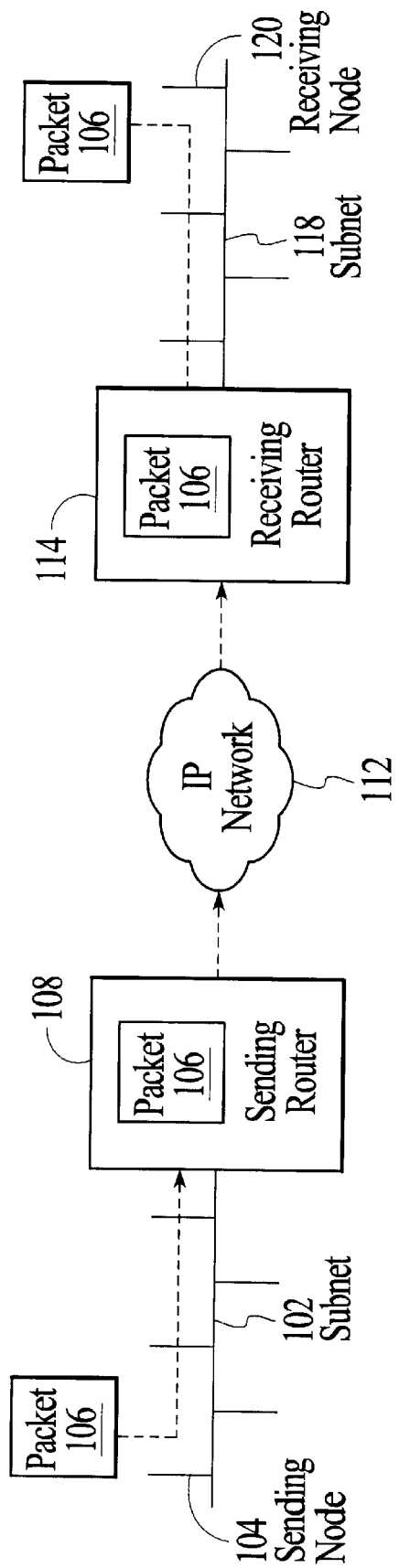
FIG. 1 illustrates a network which transports the LonTalk protocol.
Figure 2:
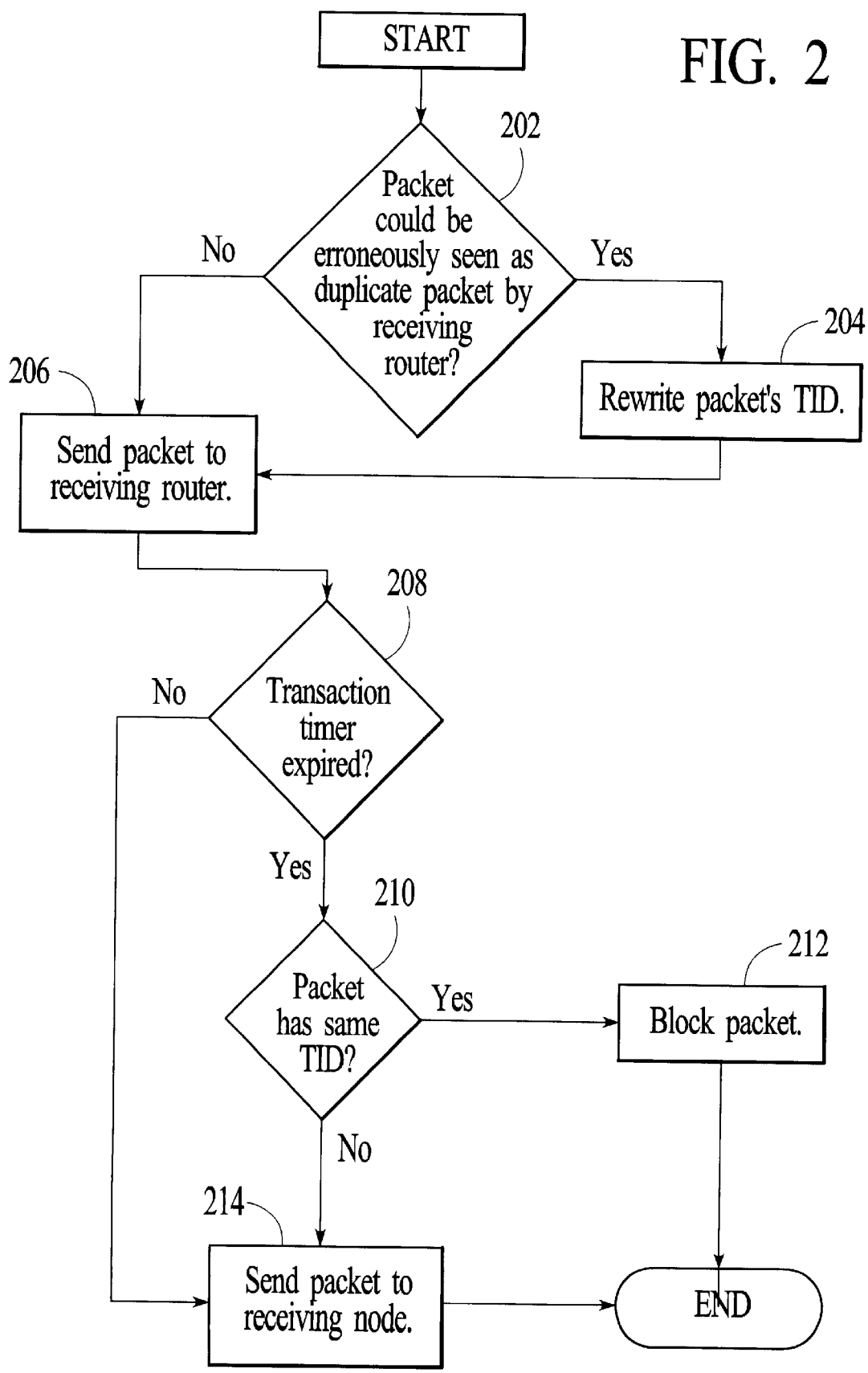
FIG. 2 is a flow chart illustrating a preferred embodiment of a method for reliable stale packet recognition in accordance with the present invention.

FIG. 2 is a flow chart illustrating a preferred embodiment of a method for reliable stale packet recognition in accordance with the present invention. Steps 202–206 are performed by the sending router 108, while steps 208–212 are performed by the receiving router 114. First, the sending router 108 (FIG. 1) determines if a packet 106 could be erroneously seen as a stale duplicate packet by the receiving router 114, via step 202. If so, then the packet's TID is rewritten, via step 204, such that the error is avoided. The packet could be erroneously seen as a duplicate packet by the receiving router 114 if the packet 106 is part of a new transaction but is assigned a TID which is identical to a TID assigned to a packet of the previous transaction. In this situation, if the transaction timer of the receiving node 120 has expired, the receiving router 114 would not be able to tell if the packet is a stale duplicate or part of a new transaction. By rewriting the packet's TID to one unique to the previous transaction, via step 204, this situation is avoided. In this manner, duplicate packets which arrive after the transaction timer expires are blocked, thus the receiving node 120 will not erroneously recognize the packet as part of a new transaction. Also, when a packet with a duplicate TID is truly part of a new transaction, it will not be blocked from the receiving node 120.

Next, the packet 106 is sent to the receiving router 114 through the IP network 112, via step 206. The receiving router 114, upon receiving the packet 106, determines if the corresponding transaction timer has expired, via step 208. If the timer has expired, the receiving router 114 then determines if the packet 106 has a duplicate TID as one already received for the transaction, via step 210. If the packet has a duplicate TID, then the receiving router 114 recognizes the packet as a stale duplicate and blocks it, via step 212. If the timer has not expired, via step 208, or if the packet 106 does not have the same TID, via step 210, the receiving router 114 sends the packet 106 to the receiving node 120, via step 214.

Figure 3:
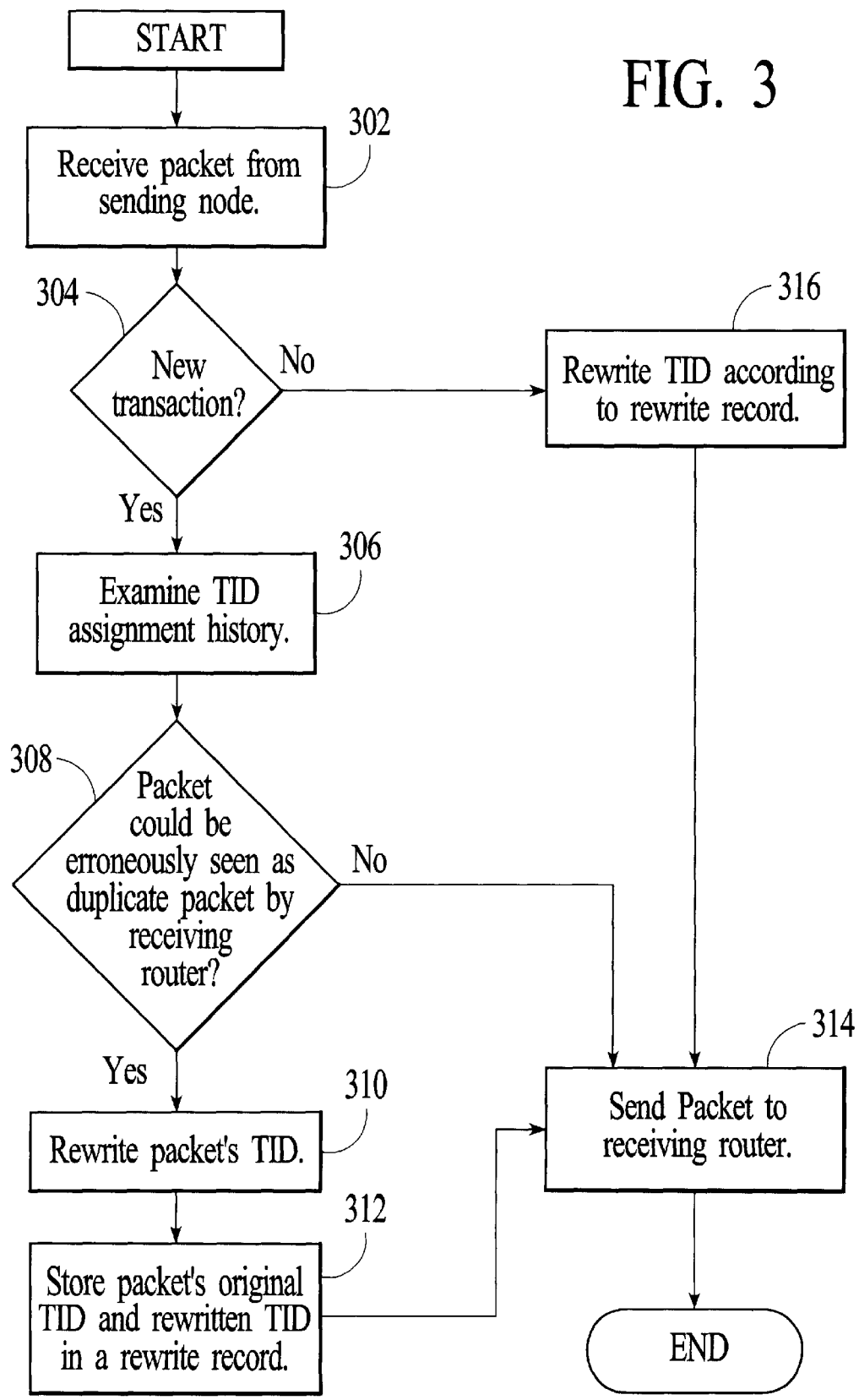
FIG. 3 is a flow chart illustrating in more detail the steps performed by the sending router in the method for reliable stale packet recognition in accordance with the present invention.

FIG. 3 is a flow chart illustrating in more detail the steps performed by the sending router in the method for reliable stale packet recognition in accordance with the present invention. First, the sending router 108 receives the packet 106 from the sending node 104, via step 302, and checks if the packet 106 is part of a new transaction, via step 304. If so, the sending router 108 then examines the history of TID assignments, via step 306, and determines if the packet 106 could be erroneously seen as a duplicate packet by the receiving router 114, via step 308. In the preferred embodiment, if the packet 106 has been assigned the same TID as a packet of a previous transaction and is destined for the same receiving node 120, then the receiving router 114 could make the error. In this situation, the sending router 108 rewrites the packet's TID, via step 310, to one which would not cause the error. In the preferred embodiment, the sending router 108 uses the TID history to choose a TID which would be unique for the receiving router 114 for the previous transaction. The sending router 108 then stores the packet's original TID and its rewritten TID in a rewrite record, via step 312. This record will be used to match the TID of an acknowledgment packet from the receiving node 120 with the packet's original TID, as described in more detail later in the specification. Next, the packet 106 is sent to the receiving router 114 through the IP network 112, via step 314. If the packet 106 is part of an ongoing transaction, its TID is rewritten in accordance with an existing rewrite record, via step 316, and then forwarded to the receiving router 114, via step 314.

Figure 4:
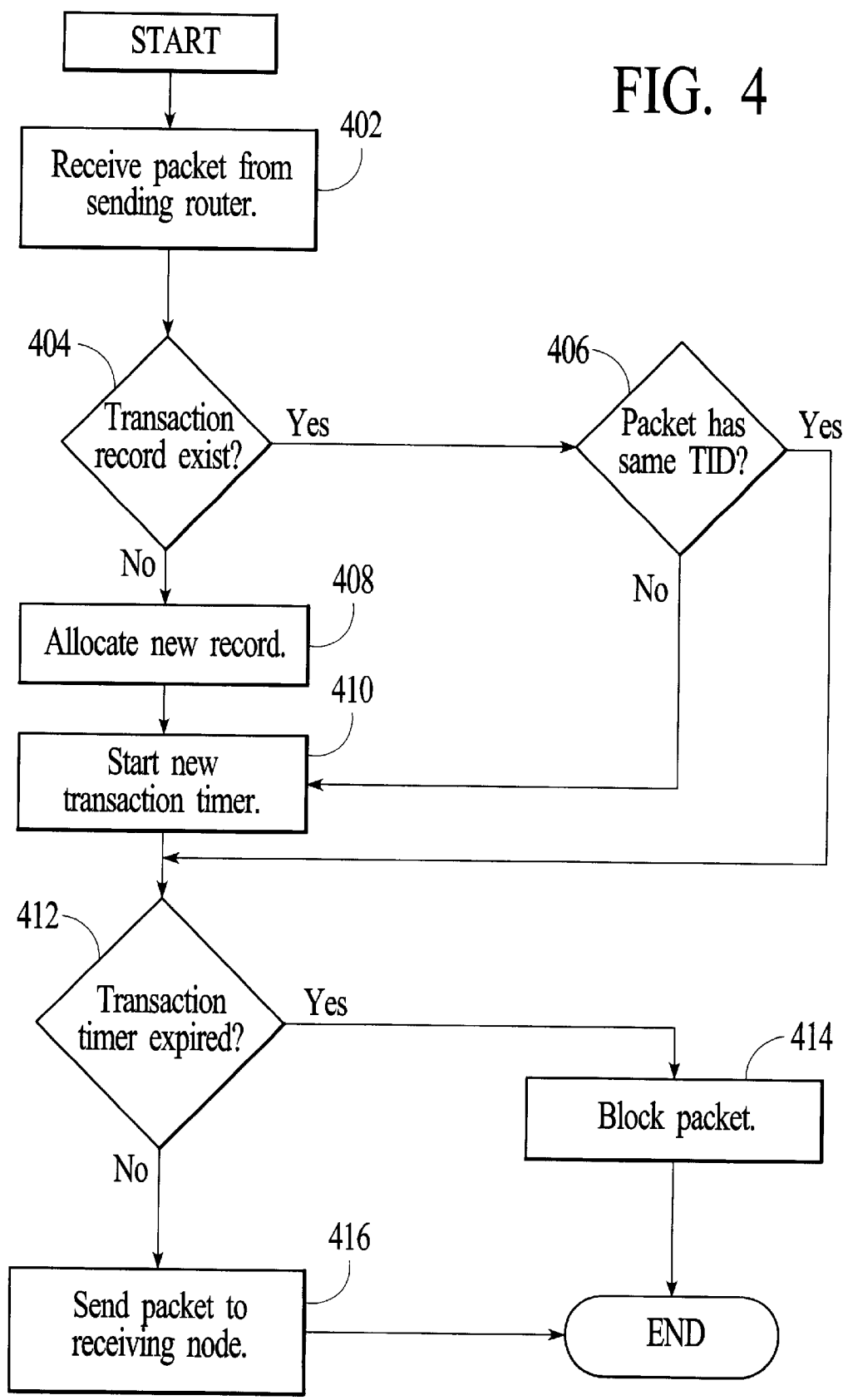
FIG. 4 is a flow chart illustrating in more detail the steps performed by the receiving router in the method for reliable stale packet recognition in accordance with the present invention.

FIG. 4 is a flow chart illustrating in more detail the steps performed by the receiving router in the method for reliable stale packet recognition in accordance with the present invention. First, the receiving router 114 receives the packet 106 from the sending router 108, via step 402. Next, the receiving router 114 determines if any transaction records exist, via step 404. If no transaction records exist, then the packet 106 is the first of a new transaction. The receiving router 114 allocates a new record for the transaction, via step 408, and starts a new transaction timer, via step 410. The packet 106 is then sent to the receiving node 120, via step 416. If a transaction record for the destination exists, via step 404, then the receiving router 114 determines if the packet 106 has the same TID as the previous transaction which is stored in the corresponding transaction record, via step 406. If not, then the packet 106 is part of a new transaction, and the receiving router 114 starts a new transaction timer, via step 410. The packet 106 is sent to the receiving node 120, via step 416. If the packet 106 has the same TID as the previous transaction, via step 406, then the receiving router 114 determines if the transaction timer for the previous transaction has expired, via step 412. If so, then the packet 106 is blocked, via step 414. Otherwise, the packet 106 is sent to the receiving node 120, via step 416. In the preferred embodiment, the receiving router 114 also has the option of removing any stored information for a previous transaction. The packet 106 is then sent to the receiving node 120, via step 412, as part of the new transaction. Once the receiving node 120 receives the packet 106, it may create an acknowledgment packet (ACK) and addresses it for the sending node 104. The ACK is forwarded from the receiving node 120 to the receiving router 114, which transmits it to the sending router 108 through the IP network 112. The ACK is assigned the same TID as the packet 106.

Figure 5:
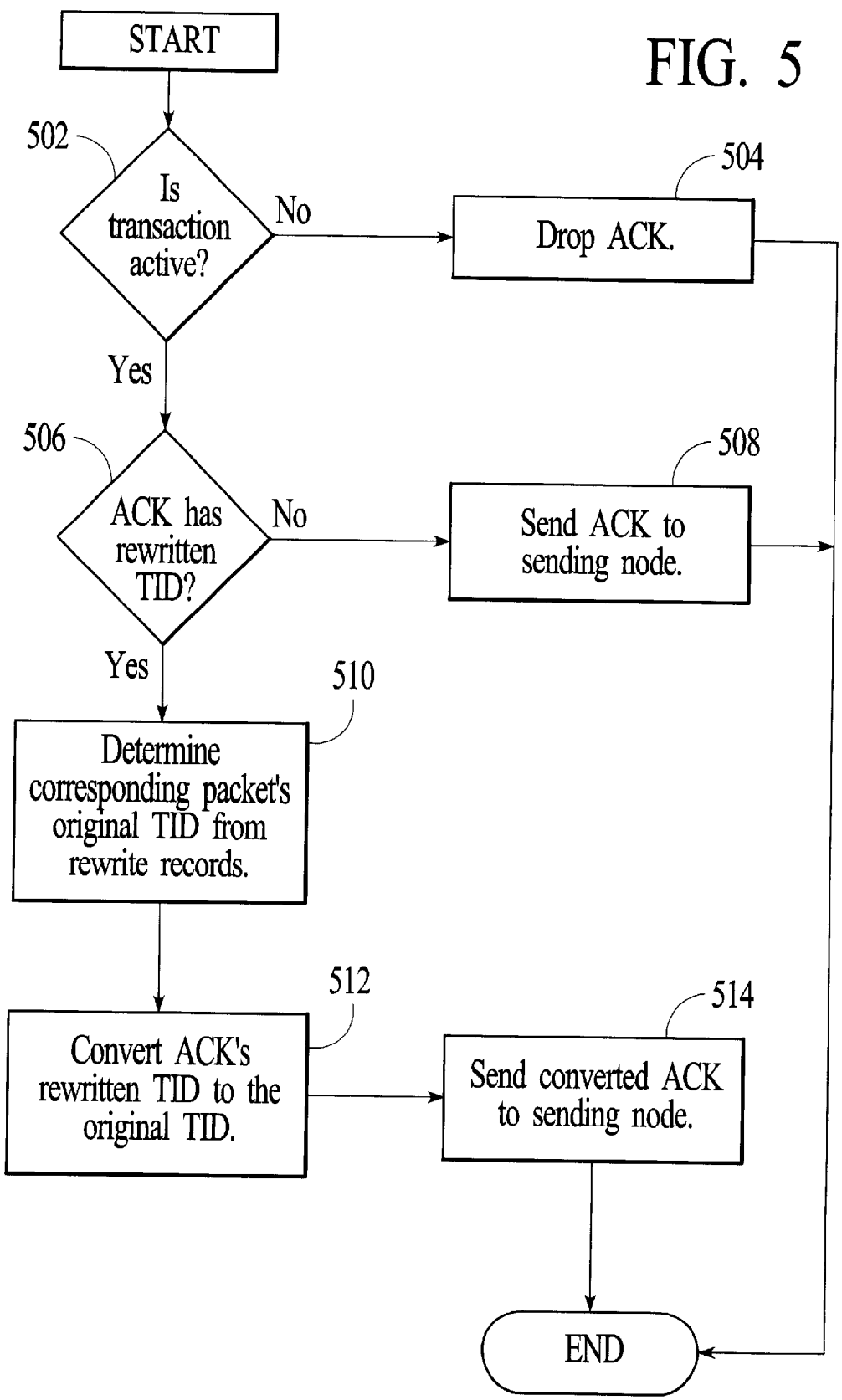
FIG. 5 is a flow chart illustrating the steps performed by the sending router when it receives an acknowledgment packet in the method for reliable stale packet recognition in accordance with the present invention.

FIG. 5 is a flow chart illustrating the steps performed by the sending router when it receives an acknowledgment packet in the method for reliable stale packet recognition in accordance with the present invention. First, the sending router 108 checks whether the transaction corresponding to the ACK is active, via step 502, and drops the ACK if it is not, via step 504. If the transaction is active, then the sending router 108 determines if the ACK has a rewritten TID, via step 506. If not, then the ACK is forwarded to the sending node 104, via step 508. If the ACK has a rewritten TID, then the sending router 108 determines the original TID of the ACK's corresponding packet 106 from its rewrite records, via step 510. The TID of the ACK is then converted from the rewritten TID to the original TID, via step 512. The converted ACK is then sent to the sending node 104, via step 514. The conversion of the ACK is necessary because the sending node 104 has no knowledge of the rewritten TID. Without the conversion, the sending node 104 would not be able to recognize the ACK for the transaction.

A method for reliable stale packet recognition in a network has been disclosed. The method blocks duplicate packets which arrive at the receiving router after the expiration of a transaction timer. When a packet for a new transaction to be sent to the receiving node is assigned the same TID as a packet of a previous transaction to the same node, the sending router rewrites the packet's TID to avoid the erroneous recognition of this packet as a duplicate by the receiving router. In this manner, if a packet with a duplicate TID is truly part of a new transaction, it will not be blocked from the receiving node. With this method, errors in the control network due to erroneous duplicate detection when run over a network are prevented.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for packet transmission in a network, the network comprising a receiving node, a receiving router, a sending node, and a sending router, comprising the steps of:

(a) rewriting a packet's transaction identifier (TID) such that the rewritten TID is not a same TID as a previous transaction if the packet could be erroneously seen as a duplicate packet by the receiving router;

(b) sending the packet to the receiving router; and (c) blocking the sent packet from transmission to the receiving node if a transaction timer has expired and if the sent packet's TID is the same TID as the previous transaction.

2. The method of claim 1, wherein the rewriting step (a) comprises:

(a1) receiving the packet from the sending node;

(a2) detecting a new transaction;

(a3) examining a TID history;

(a4) determining if the packet could be erroneously seen as a duplicate by the receiving router; and (a5) rewriting the packet's TID and storing the packet's original TID and the rewritten TID in a rewrite record, if the packet could be erroneously seen as a duplicate by the receiving router.

3. The method of claim 2, wherein the rewriting step (a5) comprises:

(a5i) rewriting the packet's TID to one unique to the receiving router and storing the packet's original TID and the rewritten TID in a rewrite record, if the packet could be erroneously seen as a duplicate by the receiving router.

4. The method of claim 1, wherein the blocking step (c) comprises:

(c1) receiving the sent packet from the sending router;

(c2) determining if a transaction record exists for the receiving router;

(c3) determining if the sent packet has the same TID as the previous transaction, if the transaction record exists;

(c4) determining if the transaction timer has expired, if the sent packet has the same TID as the previous transaction; and (c5) blocking the sent packet, if the transaction timer has expired.

5. The method of claim 4, wherein the determining step (c3) further comprises:

(c3i) allocating a new transaction record and starting a new transaction timer, if no transaction records exist.

6. The method of claim 4, wherein the determining step (c4) further comprises:

(c4i) starting a new transaction timer, if the sent packet does not have the same TID as the previous transaction.

7. The method of claim 1, further comprising:

(d) transmitting the sent packet to the receiving node if the transaction timer has not expired or if the sent packet's TID is not the same TID as the previous transaction.

8. The method of claim 7, farther comprising:

(e) receiving an acknowledgment packet (ACK);

(f) determining if the ACK has a rewritten TID;

(g) determining a corresponding packet's original TID from rewrite records, if the ACK has a rewritten TID;

(h) converting the ACK's rewritten TID to the original TID; and (i) sending the ACK with the converted TID to the sending node.

9. The method of claim 8, further comprising:

(j) sending the ACK to the sending node, if the ACK does not have a rewritten TID.

10. The method of claim 7, further comprising:

(e) receiving an ACK;

(f) determining if the transaction is active; and (g) dropping the ACK if the transaction is not active.

11. A method for packet transmission in a network, the network comprising a receiving node, a receiving router, a sending node, and a sending router, comprising the steps of:

(a) rewriting a packet's TID such that the rewritten TID is not a same TID as a previous transaction if the packet could be erroneously seen as a duplicate packet by the receiving router;

(b) sending the packet to the receiving router;

(c) determining if a transaction record exists for the receiving router;

(d) determining if the sent packet has the same TID as the previous transaction, if the transaction record exists;

(d) determining if a transaction timer has expired, if the packet has the same TID as the previous transaction; and (e) blocking the sent packet, if the transaction timer has expired.

12. The method of claim 11, wherein the rewriting step (a) comprises:

(a1) receiving the packet from the sending node;

(a2) detecting a new transaction;

(a3) examining a TID history;

(a4) determining if the packet could be erroneously seen as a duplicate by the receiving router; and (a5) rewriting the packet's TID and storing the packet's original TID and the rewritten TID in a rewrite record, if the packet could be erroneously seen as a duplicate by the receiving router.

13. The method of claim 12, wherein the rewriting step (a5) comprises:

(a5i) rewriting the packet's TID to one unique to the receiving router and storing the packet's original TID and the rewritten TID in a rewrite record, if the packet could be erroneously seen as a duplicate by the receiving router.

14. The method of claim 11, further comprising:

(f) transmitting the sent packet to the receiving node if the transaction timer has not expired or if the sent packet's TID is not the same TID as the previous transaction.

15. The method of claim 14, further comprising:

(g) receiving an ACK;

(h) determining if the ACK has a rewritten;

(i) determining a corresponding packet's original TID from rewrite records, if the ACK has a rewritten TID;

(j) converting the ACK's rewritten TID to the original TID; and (k) sending the ACK with the converted TID to the sending node.

16. The method of claim 15, further comprising:

(l) sending the ACK to the sending node, if the ACK does not have a rewritten TID.

17. The method of claim 14, further comprising:

(g) receiving an ACK;

(h) determining if the transaction is active; and (i) dropping the ACK if the transaction is not active.

18. A method for packet transmission in a network, the network comprising a receiving node, a receiving router, a sending node, and a sending router, comprising the steps of:

(a) receiving a packet from the sending node;

(b) detecting a new transaction;

(c) examining a TID history;

(d) determining if the packet could be erroneously seen as a duplicate by the receiving router;

(e) rewriting the packet's TID such that the rewritten TID is not a same TID as a previous transaction and storing the packet's original TID and the rewritten TID in a rewrite record, if the packet could be erroneously seen as a duplicate by the receiving router;

(f) sending the packet to the receiving router;

(g) determining if a transaction record exists for the receiving router;

(h) determining if the sent packet has the same TID as the previous transaction, if the transaction record exists;

(i) determining if a transaction timer has expired, if the packet has the same TID as the previous transaction; and (j) blocking the sent packet, if the transaction timer has expired.

19. A system, comprising:

a sending router, wherein the sending router receives a packet form a sending node and rewrites the packet's TID such that the rewritten TID is not a same TID as a previous transaction if the packet could be erroneously seen as a duplicate packet; and a receiving router, the receiving router capable of communicating with the sending router utilizing an Internet protocol, wherein the receiving router blocks the packet from transmission to a receiving node if a transaction timer has expired and if the packet's TID is the same TID as the previous transaction.

20. A computer readable medium with program instructions for packet transmission in a network, the network comprising a receiving node, a receiving router, a sending node, and a sending router, the instructions for:

(a) rewriting a packet's TID such that the rewritten TID is not a same TID as a previous transaction if the packet could be erroneously seen as a duplicate packet by the receiving router;

(b) sending the packet to the receiving router; and (c) blocking the sent packet from transmission to the receiving node if a transaction timer has expired and if the sent packet's TID is the same TID as the previous transaction.

\* \* \* \* \*